UNITED STATES PATENT OFFICE.

EINAR SIMONSEN, OF CHRISTIANIA, NORWAY.

TREATMENT OF MATERIALS CONTAINING CELLULOSE.

SPECIFICATION forming part of Letters Patent No. 607,091, dated July 12, 1898.

Application filed September 23, 1895. Serial No. 563,425. (No specimens.) Patented in Norway November 24, 1894, No. 4,001; in Austria February 16, 1895, No. 45/538; in England May 30, 1895, No. 10,762; in France June 1, 1895, No. 247,863; in Canada October 21, 1895, No. 50,342, and in Hungary December 3, 1895, No. 4,697.

*To all whom it may concern:*

Be it known that I, EINAR SIMONSEN, chemist, a subject of the King of Sweden and Norway, and a resident of Christiania, Norway, have invented a new and useful improvement in the treatment of materials containing cellulose—such, for instance, as mechanically and chemically prepared wood-pulp, sawdust, and the like for the manufacture of spirit— (for which I have obtained Letters Patent in Norway, No. 4,001, dated November 24, 1894; in Austria, No. 45/538, dated February 16, 1895; in England, No. 10,762, dated May 30, 1895; in France, No. 247,863, dated June 1, 1895; in Canada, No. 50,342, dated October 21, 1895, and in Hungary, No. 4,697, dated December 3, 1895,) of which the following is a specification.

This invention has relation to the manufacture of alcohol from cellulose or from materials containing cellulose; and it consists in a novel process of manufacture, as hereinafter fully described, and specifically set forth in the claim.

When I speak of "cellulose" it will of course be understood that the process, although applicable to pure cellulose, is more especially designed to the utilization of the cheaper or refuse cellulose materials—such as peat, refuse flax, or hemp—and more particularly to the utilization of refuse wood, as chips and shavings, and especially to the utilization of sawdust, the cheapest and most undesirable wood refuse.

That alcohol can be obtained from these cellulose materials by inversion of the cellulose has long been known, the process being apparently a very simple one—namely, the inversion of the cellulose by boiling the raw material in a solution of an inorganic acid under pressure, the separation of the solution from the solid residues, and the fermentation after neutralization and subsequent distillation of the fermented solution. The fact, however, that so many attempts have been made to manufacture alcohol from cellulose materials, especially from wood, all of which attempts resulted in failure, due to the low yield in alcohol and comparative excessive cost of manufacture, led me to more closely investigate the subject, and I became convinced that practically no attempts had been made to determine the relations between the factors upon which the yield in alcohol is dependent—namely, the proportion and strength of the acid solution, the pressure or temperature and the time of boiling relatively to a given quantity of cellulose material, and the influence of said factors upon the yield in alcohol. This conviction induced me to experiment in order to determine, if possible, the best and most economical relations of these factors and their mutual influence upon the yield in alcohol with a view to a commercial and profitable utilization of cellulose materials, particularly waste cellulose materials. These experiments, made under varied conditions of the factors referred to and extending over a considerable period of time, (a full statement of which may be found in the *Zeitschrift fur Angewandte Chemie, Organ des Vereins Deutscher Chemiker*, edited by Prof. Dr. F. Fisher, published by J. Springer, Berlin, 1898, No. 9,) finally enabled me to establish their relations and mutual influence upon the yield in alcohol and devise a process suitable to the commercial production of alcohol from cellulose—namely, a process whereby a maximum yield in alcohol is obtained at a minimum cost.

Broadly speaking, the relations of the four factors in the inversion of cellulose materials on an economical and hence profitable basis should be as follows: Acid solution, from three to seven parts, by weight, to one part, by weight of cellulose material; strength of solution, from four to eight tenths of one per cent.; pressure, from seven to ten atmospheres, and time of boiling not to exceed one and one-half hours. These relations or proportions may, however, vary within the limits given, the variations depending upon the nature of the cellulose material used and the character of the acid.

In the manufacture of alcohol from specific cellulose materials—as, for instance, from sawdust—I found that the most profitable results are obtained under the following conditions: Thus, for instance, a yield of sixty-five cubic centimeters of alcohol is obtained from a mash of one kilogram of sawdust and five kilograms of a solution of hydric sulfate of a strength of five-tenths of one per cent. boiled for about fifteen minutes under a pressure of nine atmospheres. Such a yield has not been obtained before my invention under similar economical conditions of cost of acid, of fuel, and of neutralizing agent, and economy of time, while the saccharine solution obtained is sufficiently concentrated so that it can after separation from the solid constituents be immediately fermented for profitable distillation. This has prior to my invention not been attained, the saccharine solutions obtained being very attenuated, thereby increasing the cost of distillation and involving redistillation, to avoid which it has been proposed to first concentrate the saccharine solution; but this also involves additional expense, for which reason such processes have proven a failure and have been abandoned. I have also found that the yield in alcohol is to some extent dependent upon the acid used, the proportion of acid solution relatively to the cellulose material being the same as above stated—i. e., five to one. For instance, I found that the yield in alcohol is somewhat reduced when hydrochloric acid is used instead of sulfuric acid, although the yield is still a profitable one. The following examples clearly show the difference:

| Solution. | Strength. | Time. | Pressure. | Yield. |
|---|---|---|---|---|
| | Per cent. | Minutes. | Atmospheres. | Per cent. |
| 1. HCl | 0.5 | 15 | 9 | 21.9 |
| 2. HCl | 0.7 | 15 | 9 | 17.4 |
| 3. HCl | 0.3 | 15 | 9 | 22.7 |
| 4. HCl | 0.3 | 10 | 12 | 19.8 |

These experiments also show that the strength of the acid solution is as important as the pressure and time, the greatest yield being obtained with a solution of three-tenths of one per cent., the mash being boiled for fifteen minutes under a pressure of nine atmospheres, the saccharine solution obtained under condition three being, as will be seen, sufficiently concentrated for immediate fermentation after separation from the solid constituents of mash and neutralization. Finally, I have determined whether the mode of heating the mash—namely, by heating the digester directly with a combustible fuel or indirectly by means of steam or water—had any influence upon the yield in alcohol. The following experiment shows that the mode of heating has no influence upon the yield in alcohol, the heat being here applied directly to the digester instead of indirectly, as in the experiments above referred to: Three hundred grams sawdust mixed with one thousand cubic centimeters of a solution of sulfuric acid of a strength of five-tenths of one per cent. boiled for fifteen minutes under a pressure of nine atmospheres yielded 23.4 per cent. of absolute alcohol—namely, a slightly-increased yield.

The neutralization of the saccharine solutions obtained by my process and their fermentation are effected in the usual manner by well-known neutralizing agents and ferments.

Having thus described my invention, what I claim as new therein, and desire to secure by Letters Patent, is—

In the manufacture of spirit from cellulose, the process of inverting the latter which consists in mashing the cellulose with a four-tenths to six-tenths of one per cent. solution of an inorganic acid in the proportions of from three to seven parts of the acid solution to one part of the cellulose, and boiling the mash under a pressure of not less than seven or more than ten atmospheres for a period not exceeding thirty minutes, and immediately fermenting the liquor in the usual manner for distillation, substantially as described.

In testimony that I claim the foregoing as my invention I have signed my name, in presence of two witnesses, this 30th day of August, 1895.

EINAR SIMONSEN.

Witnesses:
AXEL KREPLING,
ALFHIED MEYER.